US012722878B2

(12) United States Patent
Kelly

(10) Patent No.: US 12,722,878 B2
(45) Date of Patent: Sep. 1, 2026

(54) LINERS FOR BULK CONTAINERS

(71) Applicant: AMCOR FLEXIBLES NORTH AMERICA, INC., Neenah, WI (US)

(72) Inventor: Scott J. Kelly, Kimberly, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 427 days.

(21) Appl. No.: 18/571,946

(22) PCT Filed: Jun. 30, 2021

(86) PCT No.: PCT/US2021/039781
§ 371 (c)(1),
(2) Date: Dec. 19, 2023

(87) PCT Pub. No.: WO2023/277893
PCT Pub. Date: Jan. 5, 2023

(65) Prior Publication Data

US 2024/0359905 A1 Oct. 31, 2024

(51) Int. Cl.

| | |
|---|---|
| ***B65D 90/04*** | (2006.01) |
| ***B32B 27/08*** | (2006.01) |
| ***B32B 27/30*** | (2006.01) |
| ***B32B 27/32*** | (2006.01) |

(52) U.S. Cl.
CPC .............. *B65D 90/04* (2013.01); *B32B 27/08* (2013.01); *B32B 27/306* (2013.01); *B32B 27/327* (2013.01); *B32B 2250/05* (2013.01); *B32B 2250/24* (2013.01); *B32B 2307/72* (2013.01); *B32B 2307/7244* (2013.01); *B32B 2439/70* (2013.01)

(58) Field of Classification Search
CPC .............. B65D 90/04; B65D 2588/125; B65D 2590/046; B65D 90/046; B65D 25/14; B32B 27/08; B32B 27/306; B32B 27/327; B32B 2250/24; B32B 2307/72; B32B 2307/7244; B32B 2439/70; B32B 27/32; B32B 2439/00; B32B 3/08; B32B 3/04
See application file for complete search history.

(56) References Cited

U.S. PATENT DOCUMENTS

| | | | |
|---|---|---|---|
| 2007/0025648 | A1 | 2/2007 | Micnerski et al. |
| 2007/0237433 | A1 | 10/2007 | Plunkett et al. |
| 2011/0076506 | A1 | 3/2011 | Blok et al. |
| 2014/0255657 | A1 | 9/2014 | Niedersuss |
| 2016/0279910 | A1 | 9/2016 | Kohlweyer |
| 2017/0021970 | A1 | 1/2017 | Witthuhn et al. |

FOREIGN PATENT DOCUMENTS

| | | | |
|---|---|---|---|
| EP | 1297067 | B1 | 5/2005 |
| WO | 2009018659 | A1 | 2/2009 |
| WO | 2020068053 | A1 | 4/2020 |

OTHER PUBLICATIONS

PCT International Search Report, International Application No. PCT/US2021/039781, issued Oct. 7, 2021, 3 pages.

*Primary Examiner* — Michael C Miggins

(57) ABSTRACT

Described are liners for bulk containers such as intermediate bulk containers (IBC) that are abuse-resistant and barrier-providing. The liners are recyclable. The liners have at least one sidewall that is multi-plied and the plies are multi-layered. The liners are preferably metal-free and nylon-free. An outer ply comprises at least one discrete polypropylene-based film layer. Addition of polypropylene α-olefin to sealant and/or polypropylene-based film layers also improves performance. Methods of making and using the liners are also provided.

17 Claims, 3 Drawing Sheets

LINERS FOR BULK CONTAINERS

TECHNICAL FIELD

The present disclosure relates to liners for bulk containers such as drums and rigid intermediate bulk containers (IBC) that are abuse-resistant, i.e., show excellent flex-crack resistance, and are barrier-providing. The liners are recyclable. The liners are multi-plied. An outer ply is multi-layered and comprises at least one discrete polypropylene-based film layer. In embodiments, any discrete polypropylene-based film layers are located between polyethylene-based film layers.

BACKGROUND

Industrial packaging of liquid products needs to meet many kinds of requirements to ensure the product remains protected during shipping. Some requirements include providing oxygen barrier protection and providing abuse resistance such that the packaging resists cracking and pinholes. Historically, metal-containing polymer films and/or nylon films have been used for oxygen barrier purposes as an outer ply of a bulk container liner. The presence of metal or nylon in the films, however, makes recycling of the liner complex and expensive.

There is an on-going need to provide bulk container liners that provide excellent protection to the products being shipped, while at the same time are economical to both make and recycle.

SUMMARY

In order to minimize the use of metals or nylons in bulk container liners, it has been found that an outer ply comprising at least one polypropylene-based film layer in conjunction with other olefin-based layers provide both excellent flex crack resistance and puncture resistance. Configuration of the plies and the layers may be tailored depending on the nature of the liquid products to be packaged.

In an aspect, provided are liners for a bulk container, the liner comprising: at least one sidewall comprising an outer ply and an inner ply; the outer ply being multi-layered and comprising: first and second outermost layers, one or more discrete polypropylene-based film layers positioned between the first and second outermost layers, the one or more discrete polypropylene-based film layers being present in the outer ply in an amount by weight in a range of greater than or equal to 10% and less than or equal to 50%; and the inner ply attached to an outer surface of either the first or second outermost layer of the outer ply, the inner ply comprising a polyethylene-based polymer having a density of less than or equal to 0.92 g/cm$^3$; a fitment attached to the at least one sidewall, the liner comprising an overall polyolefin content of 90% by weight or greater and being suitable for recycling.

In a detailed aspect, provided is a liner for a bulk container, the liner comprising: at least one sidewall comprising an outer ply and an inner ply; the outer ply being multi-layered and symmetric and comprising: first and second outermost sealant layers; a core layer positioned at a center of the outer layer; a first multilayer stack comprising a first linear low density polyethylene (LLDPE) film layer that is adjacent to a first polypropylene-based film layer that is adjacent to a second linear low density polyethylene (LLDPE) film layer that is adjacent to a second polypropylene-based film layer that is adjacent to a third linear low density polyethylene (LLDPE) film layer, the first multilayer stack being positioned between the first outermost sealant layer and the core layer; a second multilayer stack comprising a fourth linear low density polyethylene (LLDPE) film layer that is adjacent to a third polypropylene film layer that is adjacent to a fifth linear low density polyethylene (LLDPE) film layer that is adjacent to a fourth polypropylene film layer that is adjacent to a sixth linear low density polyethylene (LLDPE) film layer, the second multilayer stack being positioned between the second outermost sealant layer and the core layer; wherein each of the first, second, third, and fourth polypropylene-based film layers has a content of: greater than or equal to 10% to less than or equal to 50% by weight of a polypropylene impact copolymer, and a propylene alpha-olefin copolymer in a range of greater than or equal 0% to less than or equal to 50%; the inner ply comprising a linear low density polyethylene (LLDPE) film layer, wherein the LLDPE has a density of less than or equal to 0.92 g/cm$^3$; a fitment attached to the at least one sidewall, the liner comprising an overall polyolefin content of 90% by weight or greater and being suitable for recycling.

Other aspects provide methods of making a liner for a bulk container, the methods comprising: coextruding a plurality of layer-specific polymer resins through a multi-orifice die thereby forming a tubular extrudate comprising a sealant layer and discrete polypropylene-based film layers therebetween; collapsing the tubular extrudate between rollers to form a flat sheet, slitting the sheet and winding onto a roll thereby forming an outer ply; attaching an inner ply to the outer ply to form a sidewall film; forming at least one sidewall from the sidewall film; adhering the at least one sidewall to another to create a seam; and attaching a fitment to one of the sidewalls to form the liner.

In another aspect, provided is a method of providing a liquid product in a bulk container, the method comprising: obtaining the liner of any embodiment disclosed herein; and packaging the liquid product in the liner. liquid product may comprises a fruit juice or a vegetable juice or a soda concentrate.

These and other aspects of the invention are described in the detailed description below. In no event should the above summary be construed as a limitation on the claimed subject matter.

BRIEF DESCRIPTION OF THE DRAWINGS

The disclosure may be more completely understood in consideration of the following detailed description of various embodiments of the disclosure in connection with the accompanying drawings, in which.

Figures 1, 2:
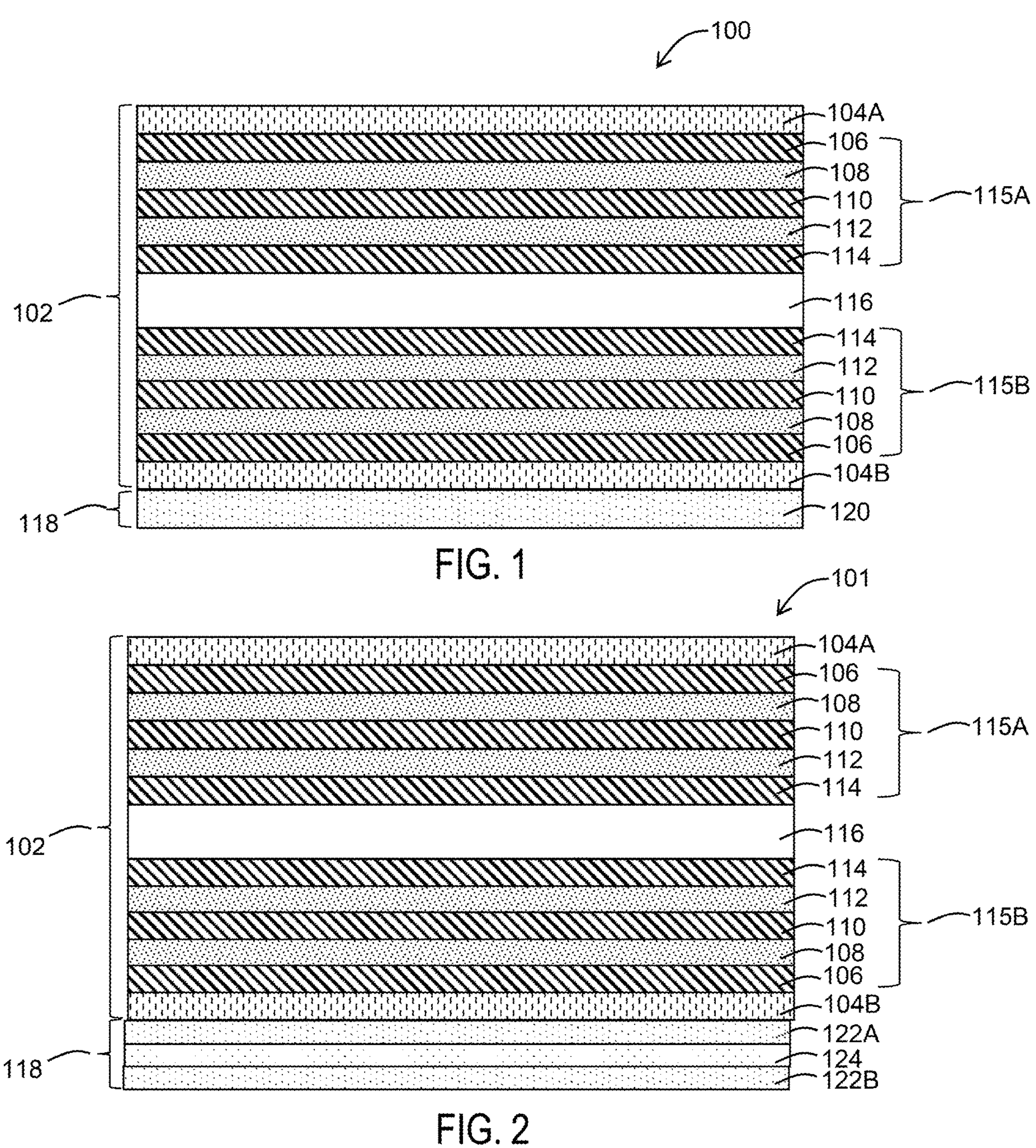
FIGS. 1-4 are schematic cross-section views of exemplary plies of different embodiments of liners.

The drawings show some but not all embodiments. The elements depicted in the drawings are illustrative and not necessarily to scale, and the same (or similar) reference numbers denote the same (or similar) features throughout the drawings.

DETAILED DESCRIPTION

Provided are liners for bulk containers such as drums and rigid intermediate bulk containers. The liners comprise a fitment and at least one sidewall having at least two plies, the plies being sealed together and the fitment being attached to the at least one sidewall. The liner fits in a bulk container. The liners herein are recyclable.

As used herein, the term "recyclable" is intended to reflect that the material can be easily processed in a recycling process that accepts "all-polyolefin" articles. Typically, these recycling processes can accept low levels of some contaminant material. As such, as used herein, recyclable refers to a liner having very high levels of polyolefin (e.g., polypropylene and polyethylene) and low levels of acceptable contaminates. A total composition defined by weight of materials defines the recyclability of the packaging film. As described herein, the "total composition" of the recyclable liner refers to all materials encompassed therein. The total composition of the liner may include between 90% and 99% polyolefin-based materials, by weight. In some embodiments, an overall olefin content of the total composition of the recyclable liner is 90% by weight or greater, or 95% by weight of greater.

A "ply" as used herein refers to a building block of sidewalls of a liner that may be supplied as a polymer film. Films used to form plies herein may be coextruded.

A "layer" as used herein refers to a structure of a single polymer-type or a blend of polymers that may be accompanied by additives. One or more plies used herein are multi-layered.

Reference to "outer ply" as used herein refers to the portion of the liner that is subject to wear and tear from the environment during shipping. The outer ply is in contact with an internal surface of a bulk container during use. In embodiments, the outer ply is multi-layered. In one or more embodiments, the outer ply is recyclable.

Reference to "inner ply" as used herein refers to the portion of the liner that forms an interior surface of the enclosed liner and directly contacts product that is packaged in the liner. In embodiments, the inner ply is monolayered or multilayered. The inner ply may have any suitable composition that is compatible with the outer ply.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

Preferably, polymers are selected from compositions approved as safe for producing articles intended for use in processing, handling and packaging of food in accordance with the U.S. Food and Drug Administration regulations under 21 CFR Section 177.1520, incorporated herein by reference.

Linear low density polyethylenes (LLDPE) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other known variations of LLDPE). Metallocene-catalyzed linear-low density polyethylenes (mLLDPE) are LLDPEs produced with a metallocene or constrained geometry catalyst.

As used herein, the term "polyethylene-based" film refers to a film that comprises high levels of polyethylene alone or copolymerized. In some cases, a polyethylene-based film layer has at least 50% polyethylene-based polymers, by weight. Or, a polyethylene-based film layer may have at least 60%, at least 70%, at least 80%, at least 90% or at least 95% polyethylene-based polymers, by weight. In some cases, a polyethylene-based film layer consists of polyethylene-based polymers. Films comprising LLDPE and/or mLLDPE are examples of "polyethylene-based" films.

Outer plies of the liners herein may contain an ethylene vinyl alcohol copolymer film layer to increase gas barrier properties. An ethylene vinyl alcohol copolymer (EVOH) is not considered to be a polyethylene-based polymer as described herein, as it can cause issues in a polyethylene or polyolefin recycling stream. The outer ply may comprise up to 10% by weight of EVOH. In embodiments, the total composition of the liner bag contains less than 5%, less than 4%, or less than 3% ethylene vinyl alcohol copolymer, by weight. Some embodiments of the liner have a total composition including between 1% and 5% ethylene vinyl alcohol copolymer, by weight.

EVOH is otherwise known as saponified or hydrolyzed ethylene vinyl acetate copolymer and refers to a vinyl alcohol copolymer having an ethylene comonomer. EVOH is prepared by the hydrolysis (or saponification) of an ethylene vinyl acetate copolymer. The degree of hydrolysis is preferably from about 50 to 100 mole percent, more preferably from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene. It is expected that processability would be facilitated at higher ethylene contents; however, gas permeabilities, particularly with respect to oxygen, may become undesirably high for certain packaging applications which are sensitive to microbial growth in the presence of oxygen. Conversely, lower ethylene content may have lower gas permeabilities, but processability may be more difficult. In some embodiments, the ethylene vinyl alcohol copolymer present in the recyclable high-barrier packaging film comprises from about 27-48 mole % ethylene. EVOH may be further optimized by blending, special copolymerization or crosslinking to be more heat resistant or enhance other properties.

As used herein, a "polypropylene-based polymer" refers to a homopolymer or copolymer having at least one propylene monomer linkage within the repeating backbone of the polymer. The propylene linkage can be represented by the general formula: $[CH_2—CH(CH_3)]_n$. Such polypropylene may be a polypropylene impact copolymer, a polypropylene random copolymer or a polypropylene homopolymer, may be syndiotactic or isotactic and/or may or may not be nucleated. Further, a polypropylene-based polymer may be a propylene alpha-olefin copolymer.

As used herein, the term "polypropylene-based" film refers to a film that comprises high levels of a polypropylene-based polymer. In some cases, a polypropylene-based film layer has at least 50% polypropylene-based polymers, by weight. Or, a polypropylene-based film layer may have at least 60%, at least 70%, at least 80%, at least 90% or at least 95% polypropylene-based polymers, by weight. In some cases, a polypropylene-based film layer consists of polypropylene-based polymers.

In one or more embodiments, a propylene alpha-olefin copolymer is an impact or fatigue modifier in that the presence of the propylene alpha-olefin copolymer improves impact and/or fatigue performance.

The term "polyamide" means a high molecular weight polymer having amide linkages $(—CONH—)_n$ which occur along the molecular chain, and includes "nylon" resins which are well known polymers having a multitude of uses including utility as packaging films, bags, and casings. See, e.g., Modern Plastics Encyclopedia, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein refers more specifically to synthetic polyamides, either aliphatic or aromatic, either in crystalline, semi-crystalline, or amorphous form characterized by the presence of the amide group —CONH. It is intended to refer to both polyamides and co-polyamides.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer.

A "sidewall" is a discrete piece of polymer film that is sealed to itself or another sidewall by, for example, welding or an adhesive, to form a bag. A "fitment" is a structure that provides an inlet/outlet for product-filling and product-dispensing from the bag.

Liners

Use of one or more polypropylene-based film layers to replace all nylon layers in bulk liners creates a liner that is recyclable without losing performance characteristics. The liners herein comprise a sidewall comprising a multilayered outer ply (e.g., a first ply) and an inner ply (e.g., a second ply), which are coextruded. The liners comprise the sidewall, and a fitment attached to the at least one sidewall. The liners comprise an overall polyolefin content of 90% by weight or greater and are suitable for recycling. In one or more embodiments, the liner is metal-free. In one or more embodiments, the liner is nylon-free. In one or more embodiments, the liner is both metal-free and nylon-free. In embodiments, the inner and outer plies are sealed together along a perimeter of the liner, and outside of the perimeter adhesion between the first and second plies is less than 100 grams per inch.

Outer Ply

The outer ply is multilayered. The outer ply comprises at least first and second outermost layers one or more discrete polypropylene-based film layers positioned between the first and second outermost layers. The one or more discrete polypropylene-based film layers are present in the outer ply in an amount by weight in a range of greater than or equal to 10% and less than or equal to 50%, and all values and subranges therebetween.

In one or more embodiments, the first and second outermost layers comprise sealant layers each comprising a polyethylene-based film layer. In one or more embodiments, the polyethylene-based film layer of the sealant layers of the outer ply comprises a blend of: a linear low density polyethylene (LLDPE) and a metallocene-catalyzed linear low density polyethylene (mLLDPE). In one or more embodiments, the sealant layers of the outer ply further comprise a propylene alpha-olefin copolymer. The propylene alpha-olefin copolymer may be present in the sealant layer in an amount by weight in range of 0% to 50%, and all values and subranges therebetween.

In one or more embodiments, a plurality of polyethylene-based inner film layers is included. In embodiments, both surfaces of each of the polypropylene-based film layers are attached to a polyethylene-based inner film layer.

In one or more embodiments, the outer ply further comprises: a core layer positioned at a center of the outer ply, a plurality of linear low density polyethylene (LLDPE) film layers, and a plurality of the discrete polypropylene-based film layers, two of the LLDPE film layers being attached to first and second surfaces of the core layer, and two of the LLDPE film layers being attached to an inner surface of each of the outermost layers, and further LLDPE film layers interleaved between the discrete polypropylene-based film layers such that there are no adjacent discrete polypropylene-based film layers.

In one or more embodiments, the one or more discrete polypropylene-based film layers comprises a polypropylene impact copolymer.

In one or more embodiments, the one or more discrete polypropylene-based film layers comprises a blend of a polypropylene impact copolymer and a propylene alpha-olefin copolymer. In one or more embodiments, the one or more discrete polypropylene-based film layers comprises a propylene alpha-olefin copolymer in a range of greater than or equal 0% to less than or equal to 50%, and all values therebetween, In embodiments, the outer ply is symmetric.

In one or more embodiments, the outer ply comprises by weight: a polypropylene-based polymer in a range of greater than or equal 10% to less than or equal to 50%; an ethylene vinyl alcohol copolymer (EVOH) in a range of 0% to less than or equal to 10%; and a polyethylene-based polymer a range of greater than or equal 40% to less than or equal to 90%. In one or more embodiments, on a polymer-content only basis, total content of the propylene-based polymer, the EVOH, and the polyethylene-based polymer total 100% in the outer ply. As is known in the art, blown film layers often contain small amounts of processing additives (e.g., non-polymers). Typically, less than or equal to 1-2% by weight of an entire ply or structure will include non-polymers.

In one or more embodiments, the outer ply comprises: first and second outermost sealant layers; a core layer positioned at a center of the outer layer; a first multilayer stack comprising a first linear low density polyethylene (LLDPE) film layer that is adjacent to a first polypropylene-based film layer that is adjacent to a second linear low density polyethylene (LLDPE) film layer that is adjacent to a second polypropylene-based film layer that is adjacent to a third linear low density polyethylene (LLDPE) film layer, the first multilayer stack being positioned between the first outermost sealant layer and the core layer; a second multilayer stack comprising a fourth linear low density polyethylene (LLDPE) film layer that is adjacent to a third polypropylene film layer that is adjacent to a fifth linear low density polyethylene (LLDPE) film layer that is adjacent to a fourth polypropylene film layer that is adjacent to a sixth linear low density polyethylene (LLDPE) film layer, the second multilayer stack being positioned between the second outermost sealant layer and the core layer; wherein each of the first, second, third, and fourth polypropylene-based film layers has a content of: greater than or equal to 10% to less than or equal to 50% by weight of a polypropylene impact copolymer, and a propylene alpha-olefin copolymer in a range of greater than or equal 0% to less than or equal to 50%.

Inner Ply

The inner ply may be monolayered or multilayered. The inner ply is attached to an outer surface of either the first or second outermost layer of the outer ply. In one or more embodiments, the inner ply comprises a sealant polyethylene-based polymer having a density of less than or equal to 0.92 g/cm$^3$.

In one or more embodiments, the inner ply comprises by weight: a propylene alpha-olefin copolymer in a range of greater than or equal 0% to less than or equal to 50%; and a linear low density polyethylene (LLDPE) in an amount of to bring a total content of the inner ply to 100% with and the propylene alpha-olefin copolymer.

In one or more embodiments, the inner ply comprises a first linear low density polyethylene (LLDPE)-containing layer sandwiched between two layers that comprise a propylene alpha-olefin copolymer in a range of greater than or equal 0% to less than or equal to 50%, and all values therebetween, and a second linear low density polyethylene (LLDPE).

Before describing several exemplary embodiments of the invention, it is to be understood that the invention is not limited to the details of construction or process steps set forth in the following description. The invention is capable of other embodiments and of being practiced or being carried out in various ways.

Turning to the figures, FIGS. 1-4 are schematic cross-section views of different embodiments of liners, which are recyclable.

In FIG. 1, the liner 100 comprises an outer (first) ply 102, which is multilayered, and an inner (second) ply 118, which is monolayer in this embodiment. The outer ply 102 comprises a symmetric structure, resulting from a collapsed bubble construction. The outer ply 102 comprises: sealant layers 104A & 104B, a first multilayer stack 115A, a second multilayer stack 115B, and a core layer 116. Overall, inner layers of outer ply 102 of the liner 100 further to the core layer comprise: a plurality of linear low density polyethylene (LLDPE) layers 106, 110, and 114; and a plurality of polypropylene (PP)-based film layers 108 and 112. The first and second multilayer stacks 115A and 115B each comprise: a first linear low density polyethylene (LLDPE) film layer 106 that is adjacent to a first polypropylene-based film layer 108 that is adjacent to a second linear low density polyethylene (LLDPE) film layer 110 that is adjacent to a second polypropylene-based film layer 112 that is adjacent to a third linear low density polyethylene (LLDPE) film layer 114. The first multilayer stack 115A is positioned between a first outermost sealant layer 104A and the core layer 116. The second multilayer stack 115B is positioned between a second outermost sealant layer 104B and the core layer 116.

As shown in FIG. 1, all of the layers are in direct contact with each other according to one or more embodiments and there are no tie or adhesive layers. The sealant layer 104A or 104B is attached to each first surface of the LLDPE layers 106, whose second surfaces are each attached to first surfaces of the PP-based film layers 108, whose second surfaces are attached to first surfaces of the LLDPE layers 110, whose second surfaces are attached to first surfaces of the PP-based film layer layers 112, whose second surfaces are attached to first surfaces of the LLDPE layers 114 whose second surfaces are each attached to the core layer 116. In this embodiment, the plurality of polypropylene (PP)-based film layers 108 and 112 comprise a polypropylene impact copolymer. In this embodiment, a propylene alpha-olefin copolymer may be present in the sealant layers in an amount by weight in range of 0% to 50%, and all values and subranges therebetween.

Inner ply 118 is attached is an outer surface of sealant layer 104B. The inner ply 118 comprises a polyethylene-based layer 120, which comprises a polyethylene-based polymer having a density of less than or equal to 0.92 g/cm$^3$. In one or more embodiments, the polyethylene-based polymer is a LLDPE. In this embodiment, a propylene alpha-olefin copolymer may be present in the a polyethylene-based layer 120 of the inner ply 118 in an amount by weight in range of 0% to 50%, and all values and subranges therebetween.

In FIG. 2, the liner 101 comprises an outer (first) ply 102, which is multilayered, and an inner (second) ply 118, which is multilayered in this embodiment. The outer ply 102 comprises a symmetric structure, resulting from a collapsed bubble construction. The outer ply 102 comprises: sealant layers 104A & 104B, a first multilayer stack 115A, a second multilayer stack 115B, and a core layer 116. Overall, inner layers of outer ply 102 of the liner 100 further to the core layer comprise: a plurality of linear low density polyethylene (LLDPE) layers 106, 110, and 114; and a plurality of polypropylene (PP)-based film layers 108 and 112. The first and second multilayer stacks 115A and 115B each comprise: a first linear low density polyethylene (LLDPE) film layer 106 that is adjacent to a first polypropylene-based film layer 108 that is adjacent to a second linear low density polyethylene (LLDPE) film layer 110 that is adjacent to a second polypropylene-based film layer 112 that is adjacent to a third linear low density polyethylene (LLDPE) film layer 114. The first multilayer stack 115A is positioned between a first outermost sealant layer 104A and the core layer 116. The second multilayer stack 115B is positioned between a second outermost sealant layer 104B and the core layer 116.

As shown in FIG. 2, all of the layers are in direct contact with each other according to one or more embodiments and there are no tie or adhesive layers. The sealant layer 104A or 104B is attached to each first surface of the LLDPE layers 106, whose second surfaces are each attached to first surfaces of the PP-based film layers 108, whose second surfaces are attached to first surfaces of the LLDPE layers 110, whose second surfaces are attached to first surfaces of the PP-based film layer layers 112, whose second surfaces are attached to first surfaces of the LLDPE layers 114 whose second surfaces are each attached to the core layer 116. In this embodiment, the plurality of polypropylene (PP)-based film layers 108 and 112 comprise a polypropylene impact copolymer. In this embodiment, a propylene alpha-olefin copolymer may be present in the sealant layers in an amount by weight in range of 0% to 50%, and all values and subranges therebetween.

Inner ply 118 is attached is an outer surface of sealant layer 104B. The inner ply 118 comprises first and second impact-enhanced polyethylene-based layers 122A and 122B, each of which comprises a blend of: a polyethylene-based polymer and a propylene alpha-olefin copolymer, which may be present in an amount by weight in range of 0% to 50%, and all values and subranges therebetween. In one or more embodiments, the impact-enhanced polyethylene-based layers 122A and 122B comprise a LLDPE and the propylene alpha-olefin copolymer. The inner ply 118 also comprises a polyethylene-based layer 124 sandwiched between the two impact-enhanced polyethylene-based layers 122A and 122B, the polyethylene-based layer 124 comprising or consisting of a polyethylene-based polymer having a density of less than or equal to 0.92 g/cm$^3$.

Figures 3, 4:
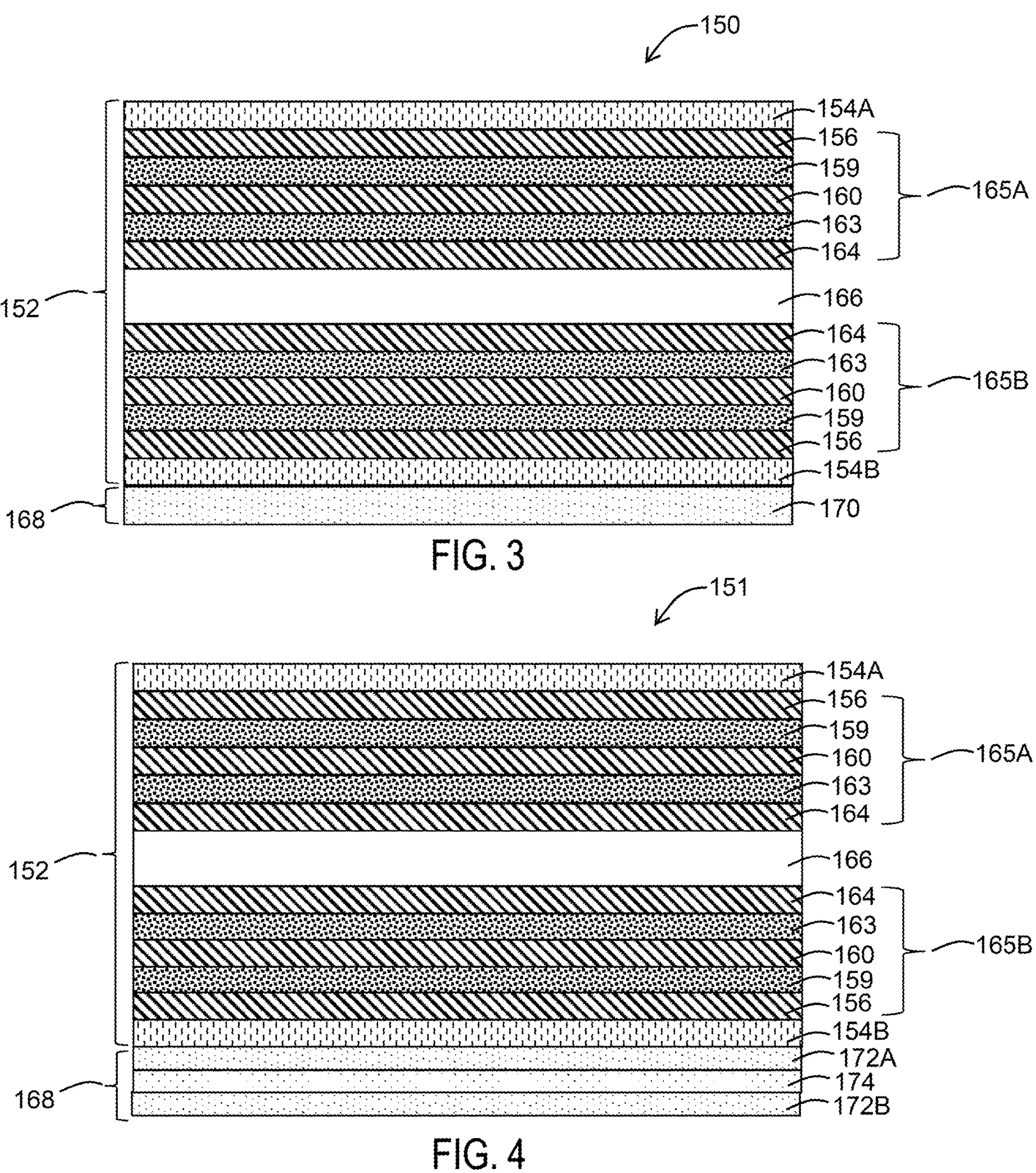

In FIG. 3, the liner 150 comprises an outer (first) ply 152, which is multilayered, and an inner (second) ply 168, which is monolayer in this embodiment. The outer ply 152 comprises a symmetric structure, resulting from a collapsed bubble construction. The outer ply 152 comprises: sealant layers 154A & 154B, a first multilayer stack 165A, a second multilayer stack 165B, and a core layer 166. Overall, inner layers of outer ply 152 of the liner 150 further to the core layer comprise: a plurality of linear low density polyethylene (LLDPE) layers 156, 160, and 164; and a plurality of polypropylene (PP)-based film layers 159 and 163. The first and second multilayer stacks 165A and 165B each comprise: a first linear low density polyethylene (LLDPE) film layer 156 that is adjacent to a first polypropylene-based film layer 159 that is adjacent to a second linear low density polyethylene (LLDPE) film layer 160 that is adjacent to a second polypropylene-based film layer 163 that is adjacent to a third linear low density polyethylene (LLDPE) film layer 164. The first multilayer stack 165A is positioned between a first outermost sealant layer 154A and the core layer 166. The second multilayer stack 165B is positioned between a second outermost sealant layer 154B and the core layer 156. In this embodiment, the plurality of polypropylene (PP)-based film layers 159 and 163 comprise a polymeric blend, which comprises: a polypropylene impact copolymer and a propylene alpha-olefin copolymer. In one or more embodiments, the propylene alpha-olefin copolymer being is in a range of greater than 0% to less than or equal to 50% by weight, and all values and subranges therebetween, of the polypropylene-based film layer. In this embodiment, a propylene alpha-olefin copolymer may be present in the sealant layers in an amount by weight in range of 0% to 50%, and all values and subranges therebetween.

As shown in FIG. 3, all of the layers are in direct contact with each other according to one or more embodiments and there are no tie or adhesive layers. The sealant layer 154A or 154B is attached to each first surface of the LLDPE layers 156, whose second surfaces are each attached to first surfaces of the PP-based film layers 159, whose second surfaces are attached to first surfaces of the LLDPE layers 160, whose second surfaces are attached to first surfaces of the PP-based film layer layers 163, whose second surfaces are attached to first surfaces of the LLDPE layers 164 whose second surfaces are each attached to the core layer 166.

Inner ply 168 is attached is an outer surface of sealant layer 154B. The inner ply 168 comprises a polyethylene-based layer 170, which comprises a polyethylene-based polymer having a density of less than or equal to 0.92 g/cm$^3$. In one or more embodiments, the polyethylene-based polymer is a LLDPE.

In FIG. 4, the liner 151 comprises an outer (first) ply 152, which is multilayered, and an inner (second) ply 168, which is monolayer in this embodiment. The outer ply 152 comprises a symmetric structure, resulting from a collapsed bubble construction. The outer ply 152 comprises: sealant layers 154A & 154B, a first multilayer stack 165A, a second multilayer stack 165B, and a core layer 166. Overall, inner layers of outer ply 152 of the liner 150 further to the core layer comprise: a plurality of linear low density polyethylene (LLDPE) layers 156, 160, and 164; and a plurality of polypropylene (PP)-based film layers 159 and 163. The first and second multilayer stacks 165A and 165B each comprise: a first linear low density polyethylene (LLDPE) film layer 156 that is adjacent to a first polypropylene-based film layer 159 that is adjacent to a second linear low density polyethylene (LLDPE) film layer 160 that is adjacent to a second polypropylene-based film layer 163 that is adjacent to a third linear low density polyethylene (LLDPE) film layer 164. The first multilayer stack 165A is positioned between a first outermost sealant layer 154A and the core layer 166. The second multilayer stack 165B is positioned between a second outermost sealant layer 154B and the core layer 156. In this embodiment, the plurality of polypropylene (PP)-based film layers 159 and 163 comprise a polymeric blend, which comprises: a polypropylene impact copolymer and a propylene alpha-olefin copolymer. In one or more embodiments, the propylene alpha-olefin copolymer being is in a range of greater than 0% to less than or equal to 50% by weight, and all values and subranges therebetween, of the polypropylene-based film layer. In this embodiment, a propylene alpha-olefin copolymer may be present in the sealant layers in an amount by weight in range of 0% to 50%, and all values and subranges therebetween.

As shown in FIG. 4, all of the layers are in direct contact with each other according to one or more embodiments and there are no tie or adhesive layers. The sealant layer 154A or 154B is attached to each first surface of the LLDPE layers 156, whose second surfaces are each attached to first surfaces of the PP-based film layers 159, whose second surfaces are attached to first surfaces of the LLDPE layers 160, whose second surfaces are attached to first surfaces of the PP-based film layer layers 163, whose second surfaces are attached to first surfaces of the LLDPE layers 164 whose second surfaces are each attached to the core layer 166.

Inner ply 168 is attached is an outer surface of sealant layer 154B. The inner ply 168 comprises first and second impact-enhanced polyethylene-based layers 172A and 172B, each of which comprises a blend of: a polyethylene-based polymer and a propylene alpha-olefin copolymer, which may be present in an amount by weight in range of 0% to 50%, and all values and subranges therebetween. In one or more embodiments, the impact-enhanced polyethylene-based layers 172A and 172B comprise a LLDPE and the propylene alpha-olefin copolymer. The inner ply 168 also comprises a polyethylene-based layer 174 sandwiched between the two impact-enhanced polyethylene-based layers 172A and 172B, the polyethylene-based layer 174 comprising or consisting of a polyethylene-based polymer having a density of less than or equal to 0.92 g/cm$^3$.

Figure 5:
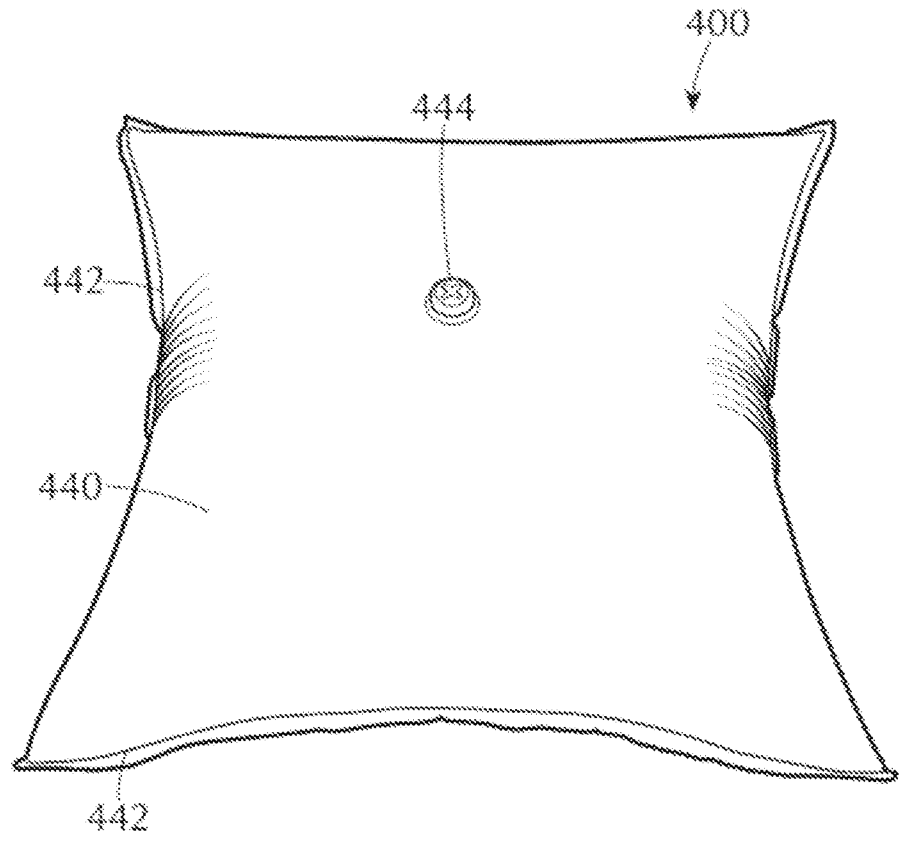
FIG. 5 is a schematic top view of a liner for a bulk container in accordance with an embodiment.

FIG. 5 is a schematic top view of a liner for a bulk container in accordance with an embodiment. The liner 400 comprises a sidewall 440 that has seams 442 to seal the sidewall 440 to another sidewall (not shown). Fitment 444 is attached to sidewall 440.

Materials

Use of a polypropylene-based film layer to replace nylon layers in bulk liners creates a liner that is recyclable without losing performance characteristics.

In one or more embodiments, the polypropylene-based film layers comprise a polypropylene impact copolymer. An exemplary polypropylene impact copolymer is TOTAL polypropylene 4170 having a density of 0.905 g/cm$^3$ and a melt flow rate of 0.75 g/10 minutes. In one or more embodiments, the polypropylene impact copolymer comprises a blend of a polypropylene homopolymer and a polypropylene-polyethylene rubber copolymer.

In one or more embodiments, the polypropylene-based film layers further comprise a propylene alpha-olefin copolymer, which can provide impact and/or fatigue enhancement. In one or more embodiments, the propylene alpha-olefin copolymer comprises a density in a range of 0.865 to 0.900 g/cm$^3$. Exemplary propylene alpha-olefin copolymers are: Basell Adflex Q100F or Mitsui Tafmer, which are polypropylene-based rubber-modified polymers.

Linear low density polyethylene (LLDPE) film layers provide support to polypropylene-based film layers in the liner as a whole. In one or more embodiments, they are used on either side of polypropylene-based film layers to provide. In one or more embodiments, the LLDPE film layers may comprise any suitable polyethylene have a density range of less than or equal to 0.92 grams/cm$^3$. Exemplary LLDPEs are ExxonMobil™ NXT 101 and ExxonMobil™ XP 6026.

In one or more embodiments, there are not any tie or adhesive layers between any of the core layer, the LLDPE layers, and the discrete polypropylene-based film layers.

Alternatively, between any of the layers, a tie or adhesive layer may be provided to provide adhesion and continuity between the layers. Adhesive compositions invention may include, but are not limited to: modified and unmodified polyolefins, preferably polyethylene, most preferably, ethylene/α-olefin copolymer, modified and unmodified acrylate resin, preferably selected from the group consisting of ethylene/vinyl acrylate copolymer, ethylene/ethyl acrylate copolymer, ethylene/butyl acrylate copolymer, or blends thereof. EVA is an ethylene/vinyl acetate co-polymer, which may be used in particular to form a layer to facilitate bonding of polymerically dissimilar layers.

Features

The liner sidewalls may be configured as needed to fit into the desired bulk container. For example, a pillow bag has seals around four edges of two plies. An exemplary bag has inner dimensions of about 81 inches (205 cm) wide by about 85" (216 cm) long.

Regarding fitments, one or more of them may be affixed through a ply for filling and dispensing from the liners. They may be any structure suitable for sealing the liquid within the liner, for example a threaded tube may be affixed through a ply and a cap threads onto the tube.

Fabrication

In general terms, to form films for liners disclosed herein, the following steps are used. Films may be fabricated by any coextrusion method known to a person of ordinary skill in the art. Films described in the Examples herein were manufactured by the following steps: (a) adding to extruders layer-specific thermoplastic resins that are suitable to result in a multi-layered film; (b) heating each of the thermoplastic resins to form streams of melt-plasticized polymers; (c) forcing the streams of melt-plasticized polymers through a multi-orifice annular die form a tubular extrudate having a diameter and a hollow interior; (d) expanding the diameter of the tubular extrudate by a volume of fluid entering the hollow interior via the central orifice; (e) collapsing the tubular extrudate onto itself to form a standard film structure. To form a collapsed bubble film, an additional step includes: (f) slitting the tubular extrudate and rolling the resulting structure to form a double wound film.

Multilayered film for the outer ply is attached to a mono- or multilayered film as the inner ply.

Upon formation of films of desired designs, films are cut to desired sizes and at least one sidewall is formed from a section of film. A fitment is attached to the sidewall. The sidewall may be sealed to itself to another sidewall to form a liner. Seals between the sidewall(s) may be achieved by methods known in the art, for example, by heat welding or by use of an adhesive.

EXAMPLES

In the following examples, reference is made to Gelbo Flex Test results. The Gelbo Flex Test was done in accordance with ASTM F392-2015. At best, there would be zero pinholes. A target range for pinholes is less than 8, or less than 5, or even less than 2.

Instron Puncture was measured by ASTM F1306-2021. Instron Dart Drop was measured by ASTM D7192-2020.

Tensile strength and elongation were measured by ASTM D882-18.

Example 1

Outer plies each having a thickness of 5 mil (127 micrometers) were formed from a collapsed bubble of a tubular extrudate. Due to the nature of the collapsed bubble forming process, the outer ply is overall symmetric. About a core layer, the remaining layers on either side were oriented as a mirror image to one another (i.e., outermost sealant layers were both outward facing).

The structure and weight percentages for each outer ply of Example 1 are summarized in TABLE 1.

TABLE 1

| SAMPLE IDENTIFICATION | Structure | Layer Wt (g/m$^2$) | Polyolefin Wt (g/m$^2$) | Poly-propylene Wt (g/m$^2$) |
|---|---|---|---|---|
| 1-A NYLON CONTROL | LDPE Blend (Dowlex 2645G & Attane 7401G) | 22.67 | 20.94708 | 0 |
| | Tie (Dowlex 2645G & Tymax GT 4300) | 13.44 | 12.096 | 0 |
| | PA Blend (Ultramid B36 and Ultramid C40) | 5.95 | 0 | 0 |
| | Tie (Dowlex 2645G & Tymax GT 4300) | 8.93 | 8.037 | 0 |
| | PA Blend (Ultramid B36 and Ultramid C40) | 5.95 | 0 | 0 |
| | Tie (Dowlex 2645G & Tymax GT 4300) | 10.01 | 9.009 | 0 |
| | EVA (Escorene Ultra LD705) | 7.44 | 0 | 0 |
| | Total composition: | | 67.32% PO | 0% PP |
| 1-B COMPARATIVE | LLDPE blend[I] | 18.60 | 17.1864 | 0 |
| | NTX-101[II] | 13.39 | 13.39 | 0 |
| | 3505[IV] | 7.44 | 7.44 | 0 |
| | 3505[IV] | 10.42 | 10.42 | 0 |
| | 3505[IV] | 7.44 | 7.44 | 0 |
| | NTX-101[II] | 9.67 | 9.67 | 0 |
| | CORE[VII] | 7.44 | 7.44 | 0 |
| | Total composition: | | 98.10% PO | 0% PP |
| 1-C COMPARATIVE | LLDPE blend[I] | 18.6 | 17.1864 | 0 |
| | NTX-101[II] | 13.39 | 13.39 | 0 |
| | 3505[IV] | 7.44 | 7.44 | 0 |
| | 3505[IV] | 10.42 | 10.42 | 0 |
| | 3505[IV] | 7.44 | 7.44 | 0 |
| | NTX-101[II] | 9.67 | 9.67 | 0 |
| | CORE[VII] | 7.44 | 7.44 | 0 |
| | Total composition: | | 98.10% PO | 0% PP |
| 1-D EXAMPLE | LLDPE blend[I] | 18.6 | 17.1864 | 0 |
| | NTX-101[II] | 13.39 | 13.39 | 0 |
| | 4170[V] | 7.44 | 7.44 | 7.44 |
| | NTX-101[II] | 10.42 | 10.42 | 0 |
| | 4170[V] | 7.44 | 7.44 | 7.44 |
| | NTX-101[II] | 9.67 | 9.67 | 0 |
| | CORE[VII] | 7.44 | 7.44 | 0 |
| | Total composition: | | 98.10% PO | 20.00% PP |

TABLE 1-continued

| SAMPLE IDENTIFICATION | Structure | Layer Wt (g/m²) | Polyolefin Wt (g/m²) | Poly-propylene Wt (g/m²) |
|---|---|---|---|---|
| 1-E EXAMPLE | LLDPE blend[I] | 18.6 | 13.39 | 0 |
| | 6026[VI] | 13.39 | 13.39 | 0 |
| | 4170[V] | 7.44 | 7.44 | 7.44 |
| | 6026[VI] | 10.42 | 10.42 | 0 |
| | 4170[V] | 7.44 | 7.44 | 7.44 |
| | 6026[VI] | 9.67 | 9.67 | 0 |
| | CORE[VII] | 7.44 | 7.44 | 0 |
| | Total composition: | | 93.00% PO | 20.00% PP |

I: "LLDPE blend[I]" is a blend of NTX-101[II] and 8784[III]. This is the sealant layer.

II: NTX-101 is ExxonMobil™ NXT 101 LLDPE (linear low density ethylene 1-hexene copolymer) having the following characteristics: Density g/cm$^3$ of 0.917 g/cm$^3$, Melt Index (190° C./2.16 kg) of 0.9 g/10 min, and Peak Melting Temp 253° F.

III: 8784 is Exceed™ 8784ML (by ExxonMobil) PE resin (ethylene-hexene copolymer) having the following characteristics: Density g/cm$^3$ of 0.914 g/cm$^3$, and Melt Index (190° C./2.16 kg) of 0.8 g/10 min. and Peak Melting Temp 250° F.

IV: 3505 is Enable™ (by ExxonMobil) LMDPE (linear medium density ethylene 1-hexene copolymer) having the following characteristics: Density g/cm$^3$ of 0.935 g/cm$^3$, Melt Index (190° C./2.16 kg) of 0.5 g/10 min, and Peak Melting Temp 253° F.

V: 4170 is TOTAL polypropylene impact copolymer having the following characteristics: Density g/cm$^3$ of 0.905 g/cm$^3$, and Melt Index (230° C./2.16 kg) of 0.75 g/10 min.

VI: 6026 is Exceed™ XP 6026 (by ExxonMobil) LLDPE (polyethylene-1-hexene copolymer) having the following characteristics: Density g/cm$^3$ of 0.916 g/cm$^3$, Melt Index (190° C./2.16 kg) of 0.2 g/10 min, and Peak Melting Temp 230° F.

Gelbo Flex test was conducted on SAMPLES 1-A to 1-G at 2 temperatures ("ambient" 73° F. and "frozen" 38° F.) at conditions of: 30 minutes, 1350 flexes, 45 flex per minute. Three specimens from each sample were tested and the average of the results is included in TABLE 2.

TABLE 2

| SAMPLE IDENTIFICATION | Gelbo Flex Test (# of pinholes) 73° F. | 38° F. |
|---|---|---|
| 1-A NYLON CONTROL | 1 | 8 |
| 1-B COMPARATIVE | 1 | 2 |
| 1-C COMPARATIVE | 1 | 2 |
| 1-D EXAMPLE | 0 | 0 |
| 1-E EXAMPLE | 0 | 1 |

Gelbo Flex test results showed improved flex crack resistance in both the ambient (73° F.) and frozen (38° F.) temperature conditions for polypropylene-containing structures (1-D, 1-E) over nylon control film 1-A and comparative PE-only containing structures (1-B and 1-C).

Instron Puncture test was conducted on SAMPLES 1-A to 1-E at two different temperatures ("ambient" 73° F. and "frozen" 38° F.). Five specimens from each sample were tested and the average of the results is included in TABLE 3.

TABLE 3

| SAMPLE IDENTIFICATION | Instron Puncture ASTM probe to outside, 73° F. Puncture N | Puncture Lbs | Displacement in. | 38° F. Puncture N | Puncture Lbs | Displacement in. |
|---|---|---|---|---|---|---|
| 1-A CONTROL | 20.5 | 4.61 | 0.45 | 25.8 | 5.79 | 0.43 |
| 1-B COMPARATIVE | 18.2 | 4.10 | 0.53 | 23.5 | 5.27 | 0.51 |
| 1-C COMPARATIVE | 19.3 | 4.33 | 0.57 | 24.1 | 5.41 | 0.53 |
| 1-D EXAMPLE | 19.7 | 4.42 | 0.54 | 24.0 | 5.39 | 0.48 |
| 1-E EXAMPLE | 22.3 | 5.02 | 0.54 | 26.2 | 5.89 | 0.48 |

VII: Core is a blend of Exceed 3812CB VLDPE, Tafmer A4085S Plastomer, and Attane NG 4701G VLDPE. Exceed 3812CB is Exceed™ (by ExxonMobil) metallocene PE resin (ethylene hexene copolymer) having the following characteristics: Density g/cm$^3$ of 0.912 g/cm$^3$, and Melt Index (190° C./2.16 kg) of 3.8 g/10 min, and Peak Melting Temp 233° F. Tafmer A4085S is Tafmer™ (by Mitsui Chemicals) Plastomer having the following characteristics: Density g/cm$^3$ of 0.885 g/cm$^3$, and Melt Index (190° C./2.16 kg) of 3.6 g/10 min. Attane NG 4701G is Attane™ (by Dow Chemicals) PE resin having the following characteristics: Density g/cm$^3$ of 0.912 g/cm$^3$, and Melt Index (190° C./2.16 kg) of 0.80 g/10 min.

Instron Puncture test results showed improved puncture resistance in both the ambient (73° F.) and frozen (38° F.) temperature conditions for polypropylene-containing structures (1-E which contained 6026 as LLDPE) (but not 1-D, which contained NXT-101 as LLDPE) over nylon control film 1-A and comparative PE-only containing structures (1-B and 1-C).

Tensile and Elongation testing was conducted on SAMPLES 1-A to 1-G temperatures ("MD" machine direction and "TD" transverse direction) using conditions of: 2" Span, 20"/Min Crosshead. Three specimens from each sample were tested and the average of the results is included in TABLES 4.A and 4.B.

TABLE 4.A

| SAMPLE IDENTIFICATION | Tensile and Elongation 2" Span, 20"/Min Crosshead MD | | | | | |
|---|---|---|---|---|---|---|
| | Thickness mils | Force at Break lbs | Stress at break psi | Elongation at break % | Energy Absorption Lb/in | Stress at Yield psi |
| 1-A CONTROL | 5.08 | 25.02 | 4,925 | 443 | 66.18 | 2,253 |
| 1-B COMPARATIVE | 5.23 | 26.86 | 5,135 | 573 | 75.91 | 1,885 |
| 1-C COMPARATIVE | 5.23 | 26.33 | 5,033 | 573 | 71.95 | 1,726 |
| 1-D EXAMPLE | 4.92 | 26.11 | 5,306 | 519 | 72.82 | 2,182 |
| 1-E EXAMPLE | 5.26 | 31.72 | 6,026 | 497 | 85.65 | 6,026 |

TABLE 4.B

| SAMPLE IDENTIFICATION | Tensile and Elongation 2" Span, 20"/Min Crosshead TD | | | | | |
|---|---|---|---|---|---|---|
| | Thickness mils | Force at Break lbs | Stress at break psi | Elongation at break % | Energy Absorption Lb/in | Stress at Yield psi |
| 1-A CONTROL | 5.18 | 26.94 | 5,204 | 522 | 75.66 | 2,187 |
| 1-B COMPARATIVE | 5.03 | 22.01 | 4,379 | 667 | 72.31 | 1,858 |
| 1-C COMPARATIVE | 5.15 | 21.87 | 4,250 | 665 | 70.45 | 1,659 |
| 1-D EXAMPLE | 5.11 | 24.22 | 4,738 | 688 | 81.54 | 1,943 |
| 1-E EXAMPLE | 4.95 | 23.97 | 4,844 | 609 | 69.91 | 1,835 |

Tensile and elongation test results showed improvements for polypropylene-containing structures (1-E) over nylon control film 1-A.

Example 2

Outer plies each having a thickness of 5 mil (127 micrometers) were formed from a collapsed bubble of a tubular extrudate. Due to the nature of the collapsed bubble forming process, the outer ply is overall symmetric. About a core layer, the remaining layers on either side were oriented as a mirror image to one another (i.e., outermost sealant layers were both outward facing).

The structure and weight percentages for each outer ply are summarized in TABLE 5. A control Sample 2-A had the same structure as Sample 1-A, which was used to compare with Samples 2-B to 2-F.

TABLE 5

| SAMPLE IDENTIFICATION | Structure | Layer Wt (g/m$^2$) | Polyolefin Wt (g/m$^2$) | Poly-propylene Wt (g/m$^2$) |
|---|---|---|---|---|
| 2-B EXAMPLE | LLDPE blend$^{VIII}$ | 18.60 | 17.1864 | 0 |
| | 6026$^{VI}$ | 13.39 | 13.39 | 0 |
| | 4170$^{V}$ | 7.44 | 7.44 | 7.44 |
| | 6026$^{VI}$ | 10.42 | 10.42 | 0 |
| | 4170$^{V}$ | 7.44 | 7.44 | 7.44 |
| | 6026$^{VI}$ | 9.67 | 9.67 | 0 |
| | CORE$^{VII}$ | 7.44 | 7.44 | 0 |
| | Total composition: | | 98.10% PO | 20.00% PP |

TABLE 5-continued

| SAMPLE IDENTIFICATION | Structure | Layer Wt (g/m$^2$) | Polyolefin Wt (g/m$^2$) | Poly-propylene Wt (g/m$^2$) |
|---|---|---|---|---|
| 2-C EXAMPLE | LLDPE blend$^{X}$ | 18.60 | 17.1864 | 0 |
| | 6026$^{VI}$ | 13.39 | 13.39 | 0 |
| | 4170$^{V}$ | 7.44 | 7.44 | 7.44 |
| | 6026$^{VI}$ | 10.42 | 10.42 | 0 |
| | 4170$^{V}$ | 7.44 | 7.44 | 7.44 |
| | 6026$^{VI}$ | 9.67 | 9.67 | 0 |
| | CORE$^{VII}$ | 7.44 | 7.44 | 0 |
| | Total composition: | | 98.10% PO | 20.00% PP |
| 2-D EXAMPLE | LLDPE blend$^{XI}$ | 18.60 | 17.1864 | 0 |
| | 6026$^{VI}$ | 13.39 | 13.39 | 0 |
| | 4170$^{V}$ | 7.44 | 7.44 | 7.44 |
| | 6026$^{VI}$ | 10.42 | 10.42 | 0 |
| | 4170$^{V}$ | 7.44 | 7.44 | 7.44 |
| | 6026$^{VI}$ | 9.67 | 9.67 | 0 |
| | CORE$^{VI}$ | 7.44 | 7.44 | 0 |
| | Total composition: | | 98.10% PO | 20.00% PP |
| 2-E EXAMPLE | LLDPE PP-α-olefin blend$^{XII}$ 10 wt % Tafmer | 7.44 | 5.90736 | 0 |
| | 6026$^{VI}$ | 14.88 | 14.88 | 0 |
| | 4170$^{V}$ | 7.44 | 7.44 | 7.44 |
| | 6026$^{VI}$ | 14.88 | 14.88 | 0 |
| | 4170$^{V}$ | 7.44 | 7.44 | 7.44 |
| | 6026$^{VI}$ | 14.88 | 14.88 | 0 |
| | CORE$^{VII}$ | 7.44 | 7.44 | 0 |
| | Total composition: | | 97.94% PO | 20.00% PP |
| 2-F EXAMPLE | LLDPE PP-α-olefin blend$^{XII}$ 25 wt % Tafmer | 7.44 | 4.79136 | 0 |
| | 6026$^{VI}$ | 14.88 | 14.88 | 0 |

TABLE 5-continued

| SAMPLE IDENTIFICATION | Structure | Layer Wt (g/m$^2$) | Polyolefin Wt (g/m$^2$) | Poly-propylene Wt (g/m$^2$) |
|---|---|---|---|---|
| | 4170$^{V}$ | 7.44 | 7.44 | 7.44 |
| | 6026$^{V}$ | 14.88 | 14.88 | 0 |
| | 4170$^{V}$ | 7.44 | 7.44 | 7.44 |
| | 6026$^{VI}$ | 14.88 | 14.88 | 0 |
| | CORE$^{VII}$ | 7.44 | 7.44 | 0 |
| | Total composition: | | 96.87% PO | 20.00% PP |

VIII: "LLDPE blend$^{VIII}$" is a blend of NTX-101$^{II}$, 3919$^{IX}$, and 8784$^{III}$. This is the sealant layer.

II: NTX-101 is ExxonMobil™ NXT 101 LLDPE (linear low density ethylene 1-hexene copolymer) having the following characteristics: Density g/cm$^3$ of 0.917 g/cm$^3$, Melt Index (190° C./2.16 kg) of 0.9 g/10 min, and Peak Melting Temp 253° F.

III: 8784 is Exceed™ 8784ML (by ExxonMobil) PE resin (ethylene-hexene copolymer) having the following characteristics: Density g/cm$^3$ of 0.914 g/cm$^3$, and Melt Index (190° C./2.16 kg) of 0.8 g/10 min. and Peak Melting Temp 250° F.

IV: 3505 is Enable™ (by ExxonMobil) LMDPE (linear medium density ethylene 1-hexene copolymer) having the following characteristics: Density g/cm$^3$ of 0.935 g/cm$^3$, Melt Index (190° C./2.16 kg) of 0.5 g/10 min, and Peak Melting Temp 253° F.

V: 4170 is TOTAL polypropylene impact copolymer having the following characteristics: Density g/cm$^3$ of 0.905 g/cm$^3$, and Melt Index (230° C./2.16 kg) of 0.75 g/10 min.

VI: 6026 is Exceed™ XP 6026 (by ExxonMobil) LLDPE (polyethylene-1-hexene copolymer) having the following characteristics: Density g/cm$^3$ of 0.916 g/cm$^3$, Melt Index (190° C./2.16 kg) of 0.2 g/10 min, and Peak Melting Temp 230° F.

VII: Core is a blend of Exceed 3812CB VLDPE, Tafmer A4085S Plastomer, and Attane NG 4701G VLDPE. Exceed 3812CB is Exceed™ (by ExxonMobil) metallocene PE resin (ethylene hexene copolymer) having the following characteristics: Density g/cm$^3$ of 0.912 g/cm$^3$, and Melt Index (190° C./2.16 kg) of 3.8 g/10 min, and Peak Melting Temp 233° F. Tafmer A4085S is Tafmer™ (by Mitsui Chemicals) Plastomer having the following characteristics: Density g/cm$^3$ of 0.885 g/cm$^3$, and Melt Index (190° C./2.16 kg) of 3.6 g/10 min. Attane NG 4701G is Attane™ (by Dow Chemicals) PE resin having the following characteristics: Density g/cm$^3$ of 0.912 g/cm$^3$, and Melt Index (190° C./2.16 kg) of 0.80 g/10 min.

IX: 3139 is Exact™ 3139 (by ExxonMobil) ethylene-based plastomer resin (ethylene-hexene copolymer) having the following characteristics: Density g/cm$^3$ of 0.900 g/cm$^3$, Melt Index (190° C./2.16 kg) of 7.5 g/10 min, and Peak Melting Temp 203° F.

X: "LLDPE blend$^{X}$" is a blend of NTX-101$^{II}$, 3919$^{IX}$, and 3518$^{XIV}$. This is the sealant layer.

XI: "LLDPE blend$^{XI}$" is a blend of 3919$^{IX}$ and 3518$^{XIV}$. This is the sealant layer.

XII: "LLDPE PP-α-olefin blend$^{XII}$" a blend of NTX-101$^{II}$ and Tafmer$^{XIII}$ and 8748$^{III}$. This is the sealant layer.

XIII: Tafmer (by Mitsui) is a polypropylene-α-olefin copolymer.

XIV: 3518 is Exceed™ 3518CB (by ExxonMobil) metallocene PE resin (ethylene-hexene copolymer) having the following characteristics: Density g/cm$^3$ of 0.918 g/cm$^3$, and Melt Index (190° C./2.16 kg) of 3.5 g/10 min.

Instron Puncture test was conducted on SAMPLES 2-A to 2-F at a single temperature (73° F.). Three specimens for each sample were tested and the average of the results is included in TABLE 6.

TABLE 6

| | Instron Puncture ASTM probe to outside 73° F. | | |
|---|---|---|---|
| SAMPLE IDENTIFICATION | Puncture N | Puncture Lbs | Displacement in. |
| 2-A NYLON CONTROL | 21.51 | 4.84 | 0.45 |
| 2-B EXAMPLE | 23.38 | 5.25 | 0.56 |
| 2-C EXAMPLE | 22.95 | 5.16 | 0.55 |
| 2-D EXAMPLE | 21.70 | 4.88 | 0.54 |
| 2-E EXAMPLE | 27.89 | 6.27 | 0.63 |
| 2-F EXAMPLE | 28.06 | 6.31 | 0.62 |

Instron Puncture test results show addition of elastomer, a polypropylene-α-olefin copolymer (Tafmer) further improves puncture resistance over nylon control, and over PP-based outer plies that do not have the elastomer.

Example 3

Outer plies each having a thickness of 5 mil (127 micrometers) were formed from a collapsed bubble of a tubular extrudate. Due to the nature of the collapsed bubble forming process, the outer ply is overall symmetric. About a core layer, the remaining layers on either side were oriented as a mirror image to one another (i.e., outermost sealant layers were both outward facing).

The structure and weight percentages for each outer ply are summarized in TABLE 7. A control Sample 3-A had the same structure as Sample 1-A, which was used to compare with Samples 3-B to 3-H.

TABLE 7

| SAMPLE IDENTIFICATION | Structure | Layer Wt (g/m$^2$) | Polyolefin Wt (g/m$^2$) | Poly-propylene Wt (g/m$^2$) |
|---|---|---|---|---|
| 3-B EXAMPLE | LLDPE blend$^{XV}$ | 7.44 | 7.2168 | 0 |
| | 6026$^{VI}$ | 14.88 | 14.88 | 0 |
| | 4170$^{V}$ | 7.44 | 7.44 | 7.44 |
| | 6026$^{VI}$ | 14.88 | 14.88 | 0 |
| | 4170$^{V}$ | 7.44 | 7.44 | 7.44 |
| | 6026$^{VI}$ | 14.88 | 14.88 | 0 |
| | CORE$^{VII}$ | 7.44 | 7.44 | 0 |
| | Total composition: | | 99.90% PO | 20.00% PP |
| 3-C EXAMPLE | LLDPE blend$^{XV}$ | 18.6 | 17.856 | 0 |
| | 6026$^{VI}$ | 13.39 | 13.39 | 0 |
| | 4170$^{V}$ | 7.44 | 7.44 | 7.44 |
| | 6026$^{VI}$ | 10.42 | 10.42 | 0 |
| | 4170$^{V}$ | 7.44 | 7.44 | 7.44 |
| | 6026$^{VI}$ | 9.67 | 9.67 | 0 |
| | CORE$^{VII}$ | 7.44 | 7.44 | 0 |
| | Total composition: | | 99.00% PO | 20.00% PP |
| 3-D EXAMPLE | LLDPE blend$^{XV}$ | 18.6 | 17.856 | 0 |
| | 6026$^{VI}$ | 13.39 | 13.39 | 0 |
| | 4170$^{V}$ + 10 wt % Q100$^{XII}$ | 7.44 | 6.696 | 6.696 |

TABLE 7-continued

| SAMPLE IDENTIFICATION | Structure | Layer Wt (g/m$^2$) | Polyolefin Wt (g/m$^2$) | Poly-propylene Wt (g/m$^2$) |
|---|---|---|---|---|
| | 6026$^{VI}$ | 10.42 | 10.42 | 0 |
| | 4170$^{V}$ + 10 wt % Q100$^{XII}$ | 7.44 | 6.696 | 6.696 |
| | 6026$^{VI}$ | 9.67 | 9.67 | 0 |
| | CORE$^{VII}$ | 7.44 | 7.44 | 0 |
| | Total composition: | | 97.00% PO | 18.00% PP |
| 3-E EXAMPLE | LLDPE blend$^{XV}$ | 7.44 | 7.2168 | 0 |
| | 6026$^{VI}$ | 14.88 | 14.88 | 0 |
| | 4170$^{V}$ + 10 wt % Q100$^{XII}$ | 7.44 | 6.696 | 6.696 |
| | 6026$^{VI}$ | 14.88 | 14.88 | 0 |
| | 4170$^{V}$ + 10 wt % Q100$^{XII}$ | 7.44 | 6.696 | 6.696 |
| | 6026$^{VI}$ | 14.88 | 14.88 | 0 |
| | CORE$^{VII}$ | 7.44 | 7.44 | 0 |
| | Total composition: | | 97.90% PO | 18.00% PP |
| 3-F EXAMPLE | LLDPE blend$^{XV}$ | 7.44 | 7.2168 | 0 |
| | 6026$^{VI}$ | 14.88 | 14.88 | 0 |
| | 4170$^{V}$ + 25 wt % Q100$^{XII}$ | 7.44 | 5.58 | 5.58 |
| | 6026$^{V}$ | 14.88 | 14.88 | 0 |
| | 4170$^{V}$ + 25 wt % Q100$^{XII}$ | 7.44 | 5.58 | 5.58 |
| | 6026$^{VI}$ | 14.88 | 14.88 | 0 |
| | CORE$^{VII}$ | 7.44 | 7.44 | 0 |
| | Total composition: | | 94.90% PO | 15% PP |
| 3-G EXAMPLE | LLDPE blend$^{XV}$ | 18.6 | 17.856 | 0 |
| | 6026$^{VI}$ | 13.39 | 13.39 | 0 |
| | 4170$^{V}$ + 25 wt % Q100$^{XII}$ | 7.44 | 5.58 | 5.58 |
| | 6026$^{V}$ | 10.42 | 10.42 | 0 |
| | 4170$^{V}$ + 25 wt % Q100$^{XII}$ | 7.44 | 5.58 | 5.58 |
| | 6026$^{VI}$ | 9.67 | 9.67 | 0 |
| | CORE$^{VI}$ | 7.44 | 7.44 | 0 |
| | Total composition: | | 94% PO | 15% PP |
| 3-H EXAMPLE (same as 2-E) | LLDPE PP-α-olefin blend$^{XII}$ 10 wt % Tafmer | 7.44 | 5.90736 | 0 |
| | 6026$^{VI}$ | 14.88 | 14.88 | 0 |
| | 4170$^{V}$ | 7.44 | 7.44 | 7.44 |
| | 6026$^{VI}$ | 14.88 | 14.88 | 0 |
| | 4170$^{V}$ | 7.44 | 7.44 | 7.44 |
| | 6026$^{VI}$ | 14.88 | 14.88 | 0 |
| | CORE$^{VI}$ | 7.44 | 7.44 | 0 |
| | Total composition: | | 97.94% PO | 20.00% PP |

XV: "LLDPE blend$^{XV}$" is a blend of 8748$^{III}$ and 3518$^{XIV}$. This is the sealant layer.

II: NTX-101 is ExxonMobil™ NXT 101 LLDPE (linear low density ethylene 1-hexene copolymer) having the following characteristics: Density g/cm$^3$ of 0.917 g/cm$^3$, Melt Index (190° C./2.16 kg) of 0.9 g/10 min, and Peak Melting Temp 253° F.

III: 8784 is Exceed™ 8784ML (by ExxonMobil) PE resin (ethylene-hexene copolymer) having the following characteristics: Density g/cm$^3$ of 0.914 g/cm$^3$, and Melt Index (190° C./2.16 kg) of 0.8 g/10 min. and Peak Melting Temp 250° F.

IV: 3505 is Enable™ (by ExxonMobil) LMDPE (linear medium density ethylene 1-hexene copolymer) having the following characteristics: Density g/cm$^3$ of 0.935 g/cm$^3$, Melt Index (190° C./2.16 kg) of 0.5 g/10 min, and Peak Melting Temp 253° F.

V: 4170 is TOTAL polypropylene impact copolymer having the following characteristics: Density g/cm$^3$ of 0.905 g/cm$^3$, and Melt Index (230° C./2.16 kg) of 0.75 g/10 min.

VI: 6026 is Exceed™ XP 6026 (by ExxonMobil) LLDPE (polyethylene-1-hexene copolymer) having the following characteristics: Density g/cm$^3$ of 0.916 g/cm$^3$, Melt Index (190° C./2.16 kg) of 0.2 g/10 min, and Peak Melting Temp 230° F.

VII: Core is a blend of Exceed 3812CB VLDPE, Tafmer A4085S Plastomer, and Attane NG 4701G VLDPE. Exceed 3812CB is Exceed™ (by ExxonMobil) metallocene PE resin (ethylene hexene copolymer) having the following characteristics: Density g/cm$^3$ of 0.912 g/cm$^3$, and Melt Index (190° C./2.16 kg) of 3.8 g/10 min, and Peak Melting Temp 233° F. Tafmer A4085S is Tafmer™ (by Mitsui Chemicals) Plastomer having the following characteristics: Density g/cm$^3$ of 0.885 g/cm$^3$, and Melt Index (190° C./2.16 kg) of 3.6 g/10 min. Attane NG 4701G is Attane™ (by Dow Chemicals) PE resin having the following characteristics: Density g/cm$^3$ of 0.912 g/cm$^3$, and Melt Index (190° C./2.16 kg) of 0.80 g/10 min.

IX: 3139 is Exact™ 3139 (by ExxonMobil) ethylene-based plastomer resin (ethylene-hexene copolymer) having the following characteristics: Density g/cm$^3$ of 0.900 g/cm$^3$, Melt Index (190° C./2.16 kg) of 7.5 g/10 min, and Peak Melting Temp 203° F.

XII: "LLDPE PP-α-olefin blend$^{XII}$" a blend of NTX-101$^{II}$ and Tafmer$^{XIII}$ and 8748$^{III}$. This is the sealant layer.

XIII: Tafmer (by Mitsui) is a polypropylene-α-olefin copolymer.

XII: Q100 (by Basell Adflex) is a polypropylene-α-olefin copolymer.

XIV: 3518 is Exceed™ 3518CB (by ExxonMobil) metallocene PE resin (ethylene-hexene copolymer) having the following characteristics: Density g/cm$^3$ of 0.918 g/cm$^3$, and Melt Index (190° C./2.16 kg) of 3.5 g/10 min.

Gelbo Flex test was conducted on SAMPLES 3-A to 3-H at 2 temperatures ("ambient" 73° F. and "frozen" 38° F.) at conditions of: 30 minutes, 1350 flexes, 45 flex per minute. Three specimens were tested from each sample and the average of the results is included in TABLE 8.

TABLE 8

| SAMPLE IDENTIFICATION | Gelbo Flex Test (# of pinholes) 73° F. | 38° F. |
|---|---|---|
| 3-A CONTROL | 1 | 8 |
| 3-B EXAMPLE | 0 | 1 |
| 3-C EXAMPLE | 0 | 1 |
| 3-D EXAMPLE | 0 | 1 |
| 3-E EXAMPLE | 0 | 1 |
| 3-F EXAMPLE | 0 | 0 |
| 3-G EXAMPLE | 0 | 0 |
| 3-H EXAMPLE | 0 | 0 |

Gelbo Flex test results showed improved flex crack resistance in both the ambient (73° F.) and frozen (38° F.) temperature conditions for all polypropylene-α-olefin and polypropylene-containing structures over nylon control 3-A. Notably, Examples 3-F and 3-G, with addition of 25 weight % polypropylene-α-olefin to the polypropylene-based layers flexed significantly better than the nylon control (3-A) at both temperatures.

Instron Puncture test was conducted on SAMPLES 3-A to 3-H at two different temperatures ("ambient" 73° F. and "frozen" 38° F.). Five specimens from each sample were tested and the average of the results is included in TABLE 9.

TABLE 9

| SAMPLE IDENTIFICATION | Instron Puncture ASTM probe to outside | | | | | |
|---|---|---|---|---|---|---|
| | 73° F. | | | 38° F. | | |
| | Puncture N | Puncture Lbs | Displacement in. | Puncture N | Puncture Lbs | Displacement in. |
| 3-A CONTROL | 20.5 | 4.61 | 0.45 | 25.8 | 5.79 | 0.43 |
| 3-B EXAMPLE | 27.80 | 6.25 | 0.63 | 33.41 | 7.51 | 0.53 |
| 3-C EXAMPLE | 27.35 | 6.15 | 0.63 | 28.80 | 6.48 | 0.47 |
| 3-D EXAMPLE | 28.23 | 6.35 | 0.65 | 27.49 | 6.18 | 0.45 |
| 3-E EXAMPLE | 28.56 | 6.42 | 0.63 | 28.92 | 6.50 | 0.47 |
| 3-F EXAMPLE | 31.72 | 7.13 | 0.71 | 29.76 | 6.69 | 0.48 |
| 3-G EXAMPLE | 29.38 | 6.61 | 0.69 | 27.32 | 6.14 | 0.45 |
| 3-H EXAMPLE | 30.67 | 6.90 | 0.67 | 27.98 | 6.29 | 0.45 |

Instron Puncture test results showed that a ply including polypropylene-based layers, with an elastomer added to the sealant layer (3-G), or a polypropylene α-olefin addition to the polypropylene-based layers (3-F) shows an improvement over a nylon control (3-A).

Instron Dart Drop test was conducted on SAMPLES 3-A to 3-H at two different temperatures ("ambient" 73° F. and "frozen" 38° F.). Four specimens from each sample were tested and the average of the results is included in TABLE 10.

TABLE 10

| SAMPLE IDENTIFICATION | Instron Dart Drop 0.75 probe to outside | | | | | |
|---|---|---|---|---|---|---|
| | 73° F. | | | 38° F. | | |
| | Peak Load Lbs | Total Deform In. | Total Energy ft-lbs | Peak Load Lbs | Total Deform In. | Total Energy ft-lbs |
| 3-A CONTROL | 68.34 | 2.37 | 8.22 | — | — | — |
| 3-B EXAMPLE | 58.45 | 2.50 | 7.56 | 59.88 | 1.82 | 5.58 |
| 3-C EXAMPLE | 55.19 | 2.44 | 7.10 | 57.89 | 1.78 | 5.29 |
| 3-D EXAMPLE | 54.51 | 2.45 | 7.01 | 57.41 | 1.85 | 5.38 |
| 3-E EXAMPLE | 59.00 | 2.56 | 7.97 | 60.80 | 1.88 | 5.91 |
| 3-F EXAMPLE | 58.69 | 2.77 | 8.55 | 62.35 | 2.00 | 6.43 |
| 3-G EXAMPLE | 57.37 | 2.63 | 7.99 | 59.24 | 1.90 | 5.72 |
| 3-H EXAMPLE | 58.41 | 2.53 | 7.66 | 58.89 | 1.85 | 5.57 |

Instron Dart Drop test results showed that under fast impact, a ply including a polypropylene α-olefin addition to the polypropylene-based layers (3-F) was able to absorb more total energy compared to the nylon control (3-A). Without intended to be bound by theory, it is thought that improved tensile properties of the plies including a polypropylene α-olefin addition to the polypropylene-based layers contributes to this improved performance.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A liner for a bulk container, the liner comprising:
at least one sidewall comprising an outer ply and an inner ply;
the outer ply being multi-layered and comprising:
first and second outermost layers,
one or more discrete polypropylene-based film layers positioned between the first and second outermost layers, the one or more discrete polypropylene-based film layers being present in the outer ply in an amount by weight in a range of greater than or equal to 10% and less than or equal to 50%; and
the inner ply attached to an outer surface of either the first or second outermost layer of the outer ply, the inner ply comprising a polyethylene-based polymer having a density of less than or equal to 0.92 g/cm$^3$;
a fitment attached to the at least one sidewall, the liner comprising an overall polyolefin content of 90% by weight or greater and being suitable for recycling.

2. The liner of claim 1, wherein the outer ply is symmetric.

3. The liner of claim 1, wherein the first and second outermost layers comprise sealant layers each comprise a polyethylene-based film layer.

4. The liner of claim 1 further comprising a plurality of polyethylene-based inner film layers.

5. The liner of claim 1, wherein the outer ply comprises by weight:

a polypropylene-based polymer in a range of greater than or equal 10% to less than or equal to 50%;

an ethylene vinyl alcohol copolymer (EVOH) in a range of 0% to less than or equal to 10%; and a polyethylene-based polymer a range of greater than or equal 40% to less than or equal to 90%.

6. The liner of claim 1, wherein the polyethylene-based film layer of the sealant layers of the outer ply comprises a blend of: a linear low density polyethylene (LLDPE) and a metallocene-catalyzed linear low density polyethylene (mLLDPE).

7. The liner of claim 1, wherein the inner ply comprises by weight:

a propylene alpha-olefin copolymer in a range of greater than or equal 0% to less than or equal to 50%; and a linear low density polyethylene (LLDPE) in an amount of to bring a total content of the inner ply to 100% with and the propylene alpha-olefin copolymer.

8. The liner of claim 1, wherein the inner and outer plies are sealed together along a perimeter of the liner, and outside of the perimeter adhesion between the first and second plies is less than 100 grams per inch.

9. The liner of claim 1, wherein the liner is metal-free and nylon-free.

10. The liner of claim 1, wherein the outer ply further comprises: a core layer positioned at a center of the outer ply, a plurality of linear low density polyethylene (LLDPE) film layers, and a plurality of the discrete polypropylene-based film layers, two of the LLDPE film layers being attached to first and second surfaces of the core layer, and two of the LLDPE film layers being attached to an inner surface of each of the outermost layers, and further LLDPE film layers interleaved between the discrete polypropylene-based film layers such that there are no adjacent discrete polypropylene-based film layers.

11. The liner of claim 10 in absence of a tie layer between any of the core layer, the LLDPE layers, and the discrete polypropylene-based film layers.

12. The liner of claim 1, wherein the one or more discrete polypropylene-based film layers comprises a polypropylene impact copolymer.

13. The liner of claim 12, wherein the one or more discrete polypropylene-based film layers comprises a blend comprising: the polypropylene impact copolymer and a propylene alpha-olefin copolymer, the propylene alpha-olefin copolymer being present in a range of greater than 0% to less than or equal to 50% by weight of the polypropylene-based film layer.

14. A liner for a bulk container, the liner comprising:

at least one sidewall comprising an outer ply and an inner ply;

the outer ply being multi-layered and symmetric and comprising:

first and second outermost sealant layers;

a core layer positioned at a center of the outer layer;

a first multilayer stack comprising a first linear low density polyethylene (LLDPE) film layer that is adjacent to a first polypropylene-based film layer that is adjacent to a second linear low density polyethylene (LLDPE) film layer that is adjacent to a second polypropylene-based film layer that is adjacent to a third linear low density polyethylene (LLDPE) film layer, the first multilayer stack being positioned between the first outermost sealant layer and the core layer;

a second multilayer stack comprising a fourth linear low density polyethylene (LLDPE) film layer that is adjacent to a third polypropylene film layer that is adjacent to a fifth linear low density polyethylene (LLDPE) film layer that is adjacent to a fourth polypropylene film layer that is adjacent to a sixth linear low density polyethylene (LLDPE) film layer, the second multilayer stack being positioned between the second outermost sealant layer and the core layer;

wherein each of the first, second, third, and fourth polypropylene-based film layers has a content of: greater than or equal to 10% to less than or equal to 50% by weight of a polypropylene impact copolymer, and a propylene alpha-olefin copolymer in a range of greater than or equal 0% to less than or equal to 50%;

the inner ply comprising a linear low density polyethylene (LLDPE) film layer, wherein the LLDPE has a density of less than or equal to 0.92 g/cm$^3$;

a fitment attached to the at least one sidewall, the liner comprising an overall polyolefin content of 90% by weight or greater and being suitable for recycling.

15. The liner of claim 14, wherein the inner ply comprises a first linear low density polyethylene (LLDPE)-containing layer sandwiched between two layers that comprise a propylene alpha-olefin copolymer in a range of greater than or equal 0% to less than or equal to 50% and a second linear low density polyethylene (LLDPE).

16. A method of providing a liquid product in a bulk container, the method comprising:

obtaining the liner of claim 1; and packaging the liquid product in the liner.

17. The method of claim 16, wherein the liquid product comprises a fruit juice, or a vegetable juice, or a soda concentrate.

* * * * *